United States Patent
Quix et al.

(10) Patent No.: US 11,846,473 B2
(45) Date of Patent: Dec. 19, 2023

(54) THERMOSTAT VALVE FOR A COOLANT CIRCUIT

(71) Applicant: Ford Global Technologies, LLC, Dearborn, MI (US)

(72) Inventors: Hans Guenter Quix, Herzogenrath (DE); Antonio Farina, Übach-Palenberg (DE); Jan Mehring, Cologne (DE); Stefan Quiring, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 17/450,958

(22) Filed: Oct. 14, 2021

(65) Prior Publication Data
US 2022/0120521 A1    Apr. 21, 2022

(30) Foreign Application Priority Data

Oct. 16, 2020    (DE) .............. 10 2020 213 110.4

(51) Int. Cl.
| F28F 27/02 | (2006.01) |
| F01P 7/16 | (2006.01) |
| F16K 31/00 | (2006.01) |
| F01P 7/14 | (2006.01) |

(52) U.S. Cl.
CPC ............... *F28F 27/02* (2013.01); *F01P 7/16* (2013.01); *F16K 31/002* (2013.01); *F01P 2007/146* (2013.01); *F01P 2025/08* (2013.01); *F28F 2250/06* (2013.01)

(58) Field of Classification Search
CPC .......... F28F 27/02; F28F 2250/06; F01P 7/16; F01P 2007/146; F01P 2025/08; F16K 31/002
See application file for complete search history.

(56) References Cited

U.S. PATENT DOCUMENTS

| 5,738,048 A | * | 4/1998 | Suzuki | ................... F01P 7/167 123/41.1 |
| 2016/0109890 A1 | * | 4/2016 | Styron | ..................... F01P 7/16 236/34.5 |

FOREIGN PATENT DOCUMENTS

DE    102018207621 B3    8/2019

* cited by examiner

*Primary Examiner* — Grant Moubry
*Assistant Examiner* — Ruben Picon-Feliciano
(74) *Attorney, Agent, or Firm* — Vincent Mastrogiacomo; McCoy Russell LLP

(57) ABSTRACT

Methods and systems are provided for a valve. In one example, a system may include a cooling arrangement including the valve, wherein the valve is configured to variably adjust coolant flow rates in response to one or more of a coolant temperature and a charge air pressure. The valve includes a transmission pin which may be acted upon via an expansion element and/or a pressure actuator.

19 Claims, 11 Drawing Sheets

THERMOSTAT VALVE FOR A COOLANT CIRCUIT

CROSS REFERENCE TO RELATED APPLICATIONS

The present application claims priority to German Patent Application No. DE 10 2020 213 110.4, entitled "219-0238 Advanced no-flow thermostat system for an internal combustion engine with boost pressure depending control function", and filed on Oct. 16, 2020. The entire contents of the above-listed application is hereby incorporated by reference for all purposes.

FIELD

The present description relates generally to an arrangement including a temperature and pressure-dependent thermostat valve for controlling a coolant flow, and to a motor vehicle having the arrangement.

BACKGROUND/SUMMARY

Reduction in carbon dioxide emissions is a desire for current and future technology of internal combustion engines. For example, various methods for counteracting carbon dioxide emissions through reduction of the internal friction in the engine have been developed. An example measure is not to allow the internal combustion engine to cool down to too great an extent during low loads by controlling the temperature of the coolant of the internal combustion engine. Compared with high loads, intense cooling is not desired at low loads, and the settings of the combustion parameters (for example of the knocking limit) also permit relatively high temperatures of the walls of the internal combustion engine. For the purpose of controlling the temperature of the coolant, use is typically made for example of thermostats or controllable valves in a coolant circuit. A control valve for controlling a coolant flow which, inter alia, has a thermostat is described, e.g. for a coolant circuit of a charge air cooler, in German Laid-Open Application 10 2018 207 621 B3. Conventional thermostats may be inexpensive and relatively robust but have a delayed reaction time, such as greater than 10 seconds. By contrast, controllable valves are relatively quick but use a complex control strategy; moreover, complex mechanisms are used to counteract overheating of the internal combustion engine in the event of degradation. It is therefore the object to control the cooling of an internal combustion engine in a quick and reliable manner.

In one example, the issues described above may be addressed by a thermostat valve for controlling the flow of a fluid medium in a coolant circuit of a pressure-chargeable internal combustion engine, which has an expansion element that is operatively connected to a transmission pin of the valve in order to control the flow of the fluid medium through the valve by a change in volume, dependent on the temperature of the fluid medium, which brings about a movement of the transmission pin. The thermostat valve further includes an actuator which can be regulated by pressure and which is additionally operatively connected to the transmission pin of the valve in order to control the flow of the fluid medium through the valve, and has at least one first connection, at least one second connection and at least one third connection, wherein the opening state and degree of opening of the second connection can be controlled by means of a first valve disk, connected to the transmission pin, and of a first valve seat in the opening region of the second connection, and those of the third connection can be controlled by means of a second valve disk, connected to the transmission pin, and of an outer valve seat in the opening region of the third connection, in each case according to the coolant temperature and the pressure acting on the actuator. An inner valve seat, at which the flow path can be closed by contact with the second valve disk, is arranged in the region of the opening region of the third connection, upstream of the outer valve seat, with the result that the opening state and the degree of opening of the third connection can likewise be controlled by means of the inner valve seat.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
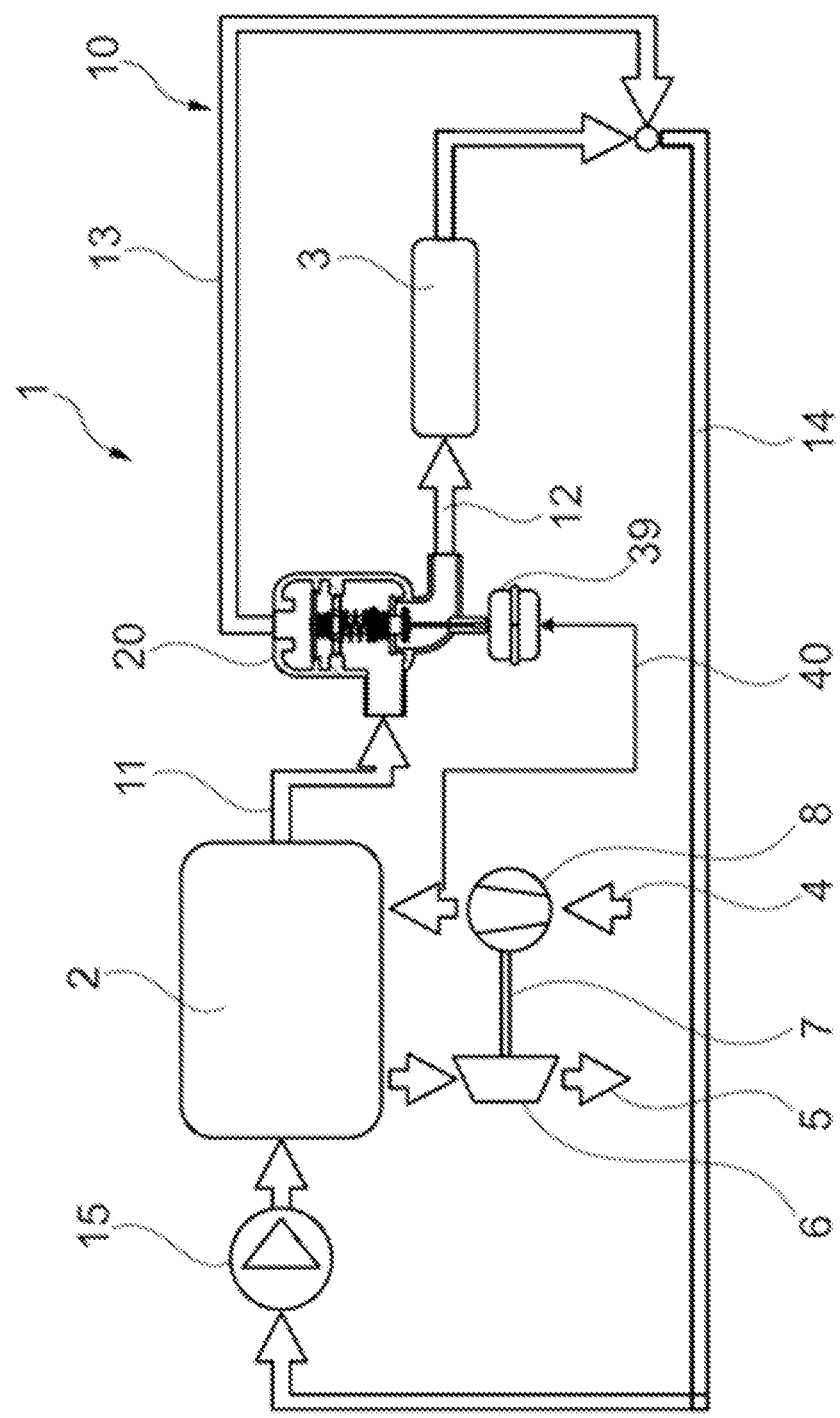
FIG. 1 shows a schematic arrangement of an embodiment of an arrangement including a thermostat valve.

The following description relates to systems and methods for a thermostat valve. The thermostat valve may be configured to control a flow of a fluid medium in a coolant circuit of a pressure-chargeable internal combustion engine. The valve may include an expansion element that is operatively connected to a transmission pin of the valve in order to control the flow of the fluid medium through the valve by a change in volume, dependent on the temperature of the fluid medium, which may move the transmission pin. The valve may further include an actuator which can be regulated by pressure and which is additionally operatively connected to the transmission pin of the valve in order to control the flow of the fluid medium through the valve. The valve may further include at least one first connection, at least one second connection, and at least one third connection, wherein the opening state and degree of opening of the second connection can be controlled via a first valve disk, connected to the transmission pin, and of a first valve seat in the opening region of the second connection, and those of the third connection can be controlled via a second valve disk, connected to the transmission pin, and of an outer valve seat in the opening region of the third connection, in each case according to the coolant temperature and the pressure acting on the actuator. An inner valve seat, at which the flow path can be closed by contact with the second valve disk, is arranged in the region of the opening region of the third connection, upstream of the outer valve seat, with the result that the opening state and the degree of opening of the third connection can likewise be controlled by means of the inner valve seat.

In some examples, the thermostat valve may be enhanced through the combination of an expansion element with a pressure-sensitive actuator relative to the previous examples described above, which provides controllable, quick, and robust monitoring of the temperature of a coolant in a coolant circuit. The thermostat valve may include two methods for closing the third connection, and control of the thermostat valve by temperature and pressure, enable the thermostat valve to open at different coolant temperatures. The thermostat valve according to the disclosure therefore makes possible simple but very flexible and efficient control of the coolant temperature.

Within the context of the disclosure, the thermostat valve in a coolant circuit is coupled to a first coolant line via the first connection, to a second coolant line via the second connection, and to a third coolant line via the third connection. The first coolant line may be a feeding line, and the second coolant line and the third coolant line are carrying-away lines (e.g., outlet lines). The term load refers to the ratio of rotational speed to torque. Here, it is clear to a person skilled in the art when a high load (full load) or a relatively low load (part load) is present at a particular internal combustion engine.

The expansion element may include wax, for example. In a certain temperature range, the wax melts and in the process undergoes a change in volume, that is to say the volume of the expansion element is increased. The expansion element therefore assumes the temperature of the coolant and changes its volume in a manner dependent on the temperature, whereby said expansion element acts on the transmission pin of the valve. The expansion element may also have other expedient volume-changing substances.

The inner valve seat in the third connection may be configured as an all-around holding web. In other words, the inner valve seat may be an elevation of the material of the inner wall of the thermostat valve, for example. Alternatively, it is also possible for the inner valve seat to be composed of a material different from that of the wall of the thermostat valve and to be inserted from outside into the thermostat valve. Here, the inner valve seat is of uniform design, thus allowing complete closure of the flow path by contact with the upper valve plate.

The pressure-sensitive actuator of the thermostat valve according to the disclosure may be connected to variable-pressure surroundings via a connecting line. The pressure-variable surroundings may correspond to the intake tract of the internal combustion engine. As a result, changes in the charge pressure may affect the movement of the transmission pin. In this way, a pressure generated by a compressor arranged in the intake tract (charge pressure) can be transmitted to the actuator. Here, a high charge pressure, which correlates with a high load of the internal combustion engine, effects a movement of the transmission pin and thus a lower opening temperature of the thermostat valve with respect to the cooler. Thus, at high loads, the thermostat valve according to the disclosure may allow a lower opening temperature of the valve with respect to the heat exchanger than conventional valves. Thus, at the commencement of high loading, heat can be dissipated from the internal combustion engine at an early stage.

The second valve disk may be in closed contact with the inner valve seat when the transmission pin is in its starting position. In this case, the flow paths through the third and second connection are closed since, in this position, a flow of coolant is not allowed either via the second or via the third connection. If the second connection is connected to a heat exchanger (also referred to as a cooler) and the third connection is connected to a bypass line of the heat exchanger, there is therefore no flow of coolant in the circuit. Under conditions of low coolant temperatures and a low charge pressure, that is to say particularly after the starting of a corresponding internal combustion engine, this state has the effect that there is no coolant flow and the internal combustion engine warms up more quickly. As a result, temperatures of the internal combustion engine which lead to favorable combustion of the fuel with regard to low carbon dioxide emissions may be achieved more quickly.

The second valve disk may be in closed contact with the outer valve seat when the transmission pin is in its end position. The flow path via the third connection is thereby closed. In this case, the second connection is at least partially open (at a low charge pressure) at least due to the temperature effect on the expansion element, and it may also be completely open (at a high charge pressure). Thus, under operating conditions of high temperatures of the internal combustion engine, the coolant may pass completely through the cooler and controlled according to the load.

In one example, in the thermostat valve according to the disclosure, in a first working state, the second connection and the third connection are closed. In a second working state, the second connection is closed and the third connection is at least partially open. In a third working state, the second connection is at least partially open and the third connection is partially open. In a fourth working state the second connection is partially open, but to a greater extent than in the third state, and the third connection is closed. In a fifth working state, the second connection is completely open and the third connection is closed. The working states are characterized by different expansions of the expansion element, brought about by different temperatures of the coolant, and by different positions of the actuator, brought about by different pressure states in the intake tract, which in turn each act on the transmission pin. The possible working states are not limited to this listing. In each of the first through fifth working states, the first connection is open.

As an example, the third connection is closed in the first working state by contact of the second valve disk with the inner valve seat, and is closed in the fourth and fifth working states by contact of the second valve disk with the outer valve seat. In the third working state, the second valve disk is further away from the inner valve seat than in the second working state.

A second aspect of the disclosure relates to an arrangement of an internal combustion engine, having an intake tract and an exhaust tract, wherein a compressor is arranged in the intake tract, and having a coolant circuit with at least one first, second and third coolant line, which has a thermostat valve according to the disclosure. Here, the advantages of the arrangement correspond to those of the thermostat valve. The compressor may be a compressor of a turbocharger or a compressor driven electrically or mechanically in some other way.

In some examples, in the arrangement according to the disclosure, the pressure-sensitive actuator is connected to the intake tract of the internal combustion engine downstream of the compressor via a connecting line. This arrangement allows transmission of the pressure from the intake tract to the actuator, which, at sufficiently high pressure, can actuate the valve.

In one example, in the arrangement according to the disclosure, the first coolant line is connected to a cooling jacket of the internal combustion engine, the second coolant line is connected to a heat exchanger, and the third coolant line is the bypass line of the heat exchanger.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In the embodiment according to the illustration in FIG. 1, an arrangement according to the disclosure has an internal combustion engine 2, from which coolant is passed to a heat exchanger 3 via a coolant circuit 10. Here, the internal combustion engine 2 may be surrounded at least partially by a cooling jacket, in which the coolant flows and absorbs and dissipates heat from the internal combustion engine 2. In the heat exchanger 3, which may also be referred to as a cooler, the heat is transferred from the coolant to the surroundings or to another heat carrier. The coolant may include water or a water-glycol mixture.

The internal combustion engine 2 may be connected to an intake tract 4 for feeding of combustion air and to an exhaust tract 5 for discharge of exhaust gas. There is arranged in the exhaust tract 5 a turbine 6, and in the intake tract a compressor 8, of an exhaust-gas turbocharger, which compressor is connected to the turbine 6 via a shaft 7.

In some examples, the internal combustion engine 2 may be arranged in a partially electric vehicle which may include a traction battery and an electric motor. The traction battery and electric motor may assist the internal combustion engine 2 in driving wheels of the vehicle. In some examples, the compressor 8 may be partially or completely driven electrically. As such, the turbine 6, and shaft 7, may be omitted in some embodiments.

To control the coolant flow in the coolant circuit 10, the arrangement 1 includes a thermostat valve 20 according to the disclosure. In the coolant circuit 10, a first coolant line 11 leads from the internal combustion engine 2 to the thermostat valve 20. The thermostat valve 20 is configured to conduct the coolant, in a manner dependent on the temperature of the coolant, through a second coolant line 12, in which the heat exchanger 3 is arranged, or through a third coolant line 13, which is provided as a bypass line of the heat exchanger 3. Downstream of the heat exchanger 3, the second coolant line 12 and the third coolant line 13 are combined to form a fourth coolant line 14. A coolant pump 15 is arranged in the fourth coolant line 14 and is provided for effecting the flow in the coolant circuit 10.

Figure 2:
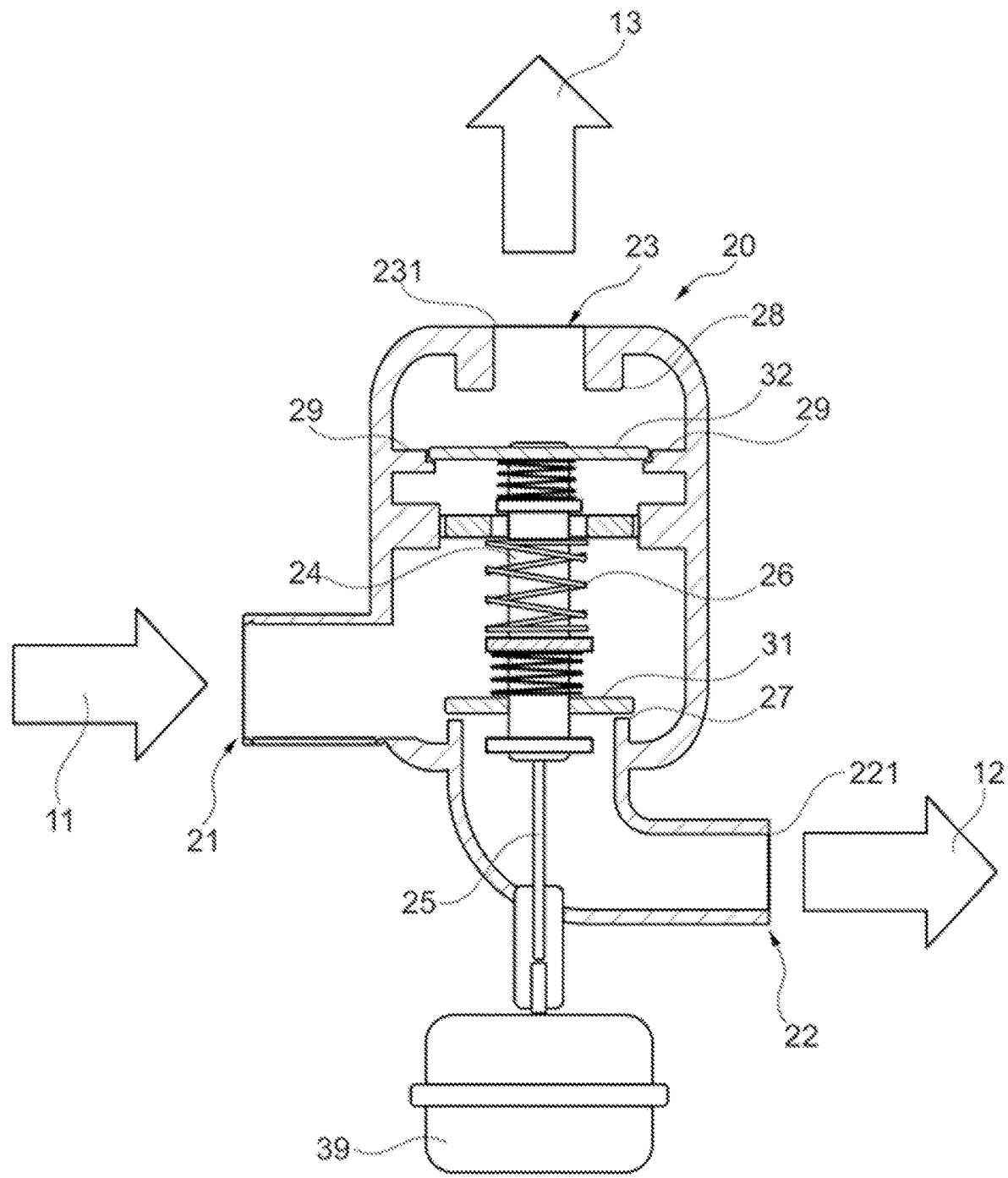
FIG. 2 shows a sectional illustration of an embodiment of the thermostat valve according to the disclosure in a first working state.

The thermostat valve 20 may include a first connection 21 for the first coolant line 11, a second connection 22 for the second coolant line 12, and a third connection 23 for the third coolant line 13, as shown in FIG. 2. The flow of the coolant through the connections is controlled in the thermostat valve 20. For this purpose, the thermostat valve 20 has an expansion element 24 as a temperature-sensitive element. The expansion element 24 may change in response to the temperature of the coolant which comes from the internal combustion engine 2. The expansion element 10 may include wax as expansion material in a housing. A significant change in volume of the wax occurs in the range of approximately 85-95° C. due to a phase transition. The change in volume is converted into a movement of a transmission pin 25.

The thermostat valve 20 furthermore has a pressure-sensitive actuator 39. The pressure-sensitive actuator 39 is configured to react to differences in pressure and, in the case of elevated pressure, to effect a movement of the transmission pin 25. To exert the pressure on the actuator 39, the arrangement 1 has a connecting line 40 from the intake tract 4 to the actuator 39. The connecting line 40 branches off from the intake tract 4 downstream of the compressor 8, with the result that the pressure conditions upstream of the internal combustion engine 2 can be transmitted to the actuator 39. In this way, the actuator 39 influences the opening temperature of the thermostat valve 20 according to the charge pressure.

The respective opening status of the second connection 22 and of the third connection 23 may be controlled by the movement of the transmission pin 25 in accordance with the coolant temperature and the charge pressure. When the wax cools down again or the charge pressure decreases, the transmission pin 25 is pushed back into its starting position, for example by a spring mechanism 26.

To control the respective opening status, a first valve seat 27 is formed in the opening region 221 of the second connection 22. The transmission pin 25 is connected to a first valve disk 31, which is provided for the purpose of closing the flow path in the region of the second connection opening 22. Here, the first valve disk 31 has the first valve seat 27 as a counterpart, at which the flow path in the second connection 22 is closed by contact with the first valve disk 31.

Formed in the opening region 231 of the third connection is an outer valve seat 28 and, upstream thereof, an inner valve seat 29, which are the counterparts for a second valve disk 32 connected to the transmission pin 25. The flow path in the region of the third connection 23 can be closed alternately at valve seats 28 and 29. Thus, there are two points for the closure of the flow path in the region of the third connection 23, namely, on the one hand, in the starting position of the transmission pin 25 and, on the other hand, in the end position of the transmission pin 25.

The inner valve seat 29 is configured as an all-around holding web. This should be interpreted as an elevation of the material of the inner wall of the thermostat valve 20. Here, the material can be formed from the material of the wall, i.e. can bulge out, or can be introduced as an annular material into the thermostat valve 20 and connected to the inner wall, e.g. by means of a welding process. Here, the holding web is of uniform design, thus allowing complete closure of the flow path by contact with the second valve disk 32. Said another way, the inner valve seat 29 may include a ring-shape, wherein an outer diameter of the inner valve seat 29 is physically coupled to interior surfaces of the valve 20. An inner diameter of the inner valve seat 29 may be configured to contact the second valve disk 32 and limit a movement thereof.

The function of the thermostat valve 20 according to the disclosure can be described on the basis of various working states of the thermostat valve 20 shown in FIGS. 2-9. All the values used are illustrative and can be varied by corresponding design of the components, depending on the use. Here, the solid arrows within the thermostat valve 20 indicate the flow of the coolant.

In a first working state shown in FIG. 2, the temperature of the coolant may be less than a first threshold temperature. In one example, the first threshold temperature corresponds to a cold-start, which may occur when an engine temperature is less than a desired temperature or an ambient temperature. In one example, the first threshold temperature is equal to 80° C. In this case, the expansion element 24 has its smallest extent. At the same time, a low charge pressure prevails in the intake tract 4, with the result that the actuator 39 is not activated. Here, the transmission pin 25 is in its starting position. In this case, the second connection 22 is closed by complete contact of the first valve disk 31 with the first valve seat 27, as is the third connection 23 by contact of the second valve disk 32 with the inner valve seat 29. As a result, there is absolutely no flow of coolant in the coolant circuit 10. The first working state as per FIG. 2 is present, for example, shortly after the starting of the internal combustion engine 2, i.e. when the internal combustion engine 2 is warming up. It may be desired to block the flow of coolant to the valve to mitigate dissipation of heat from the internal combustion engine 2.

Figure 3:
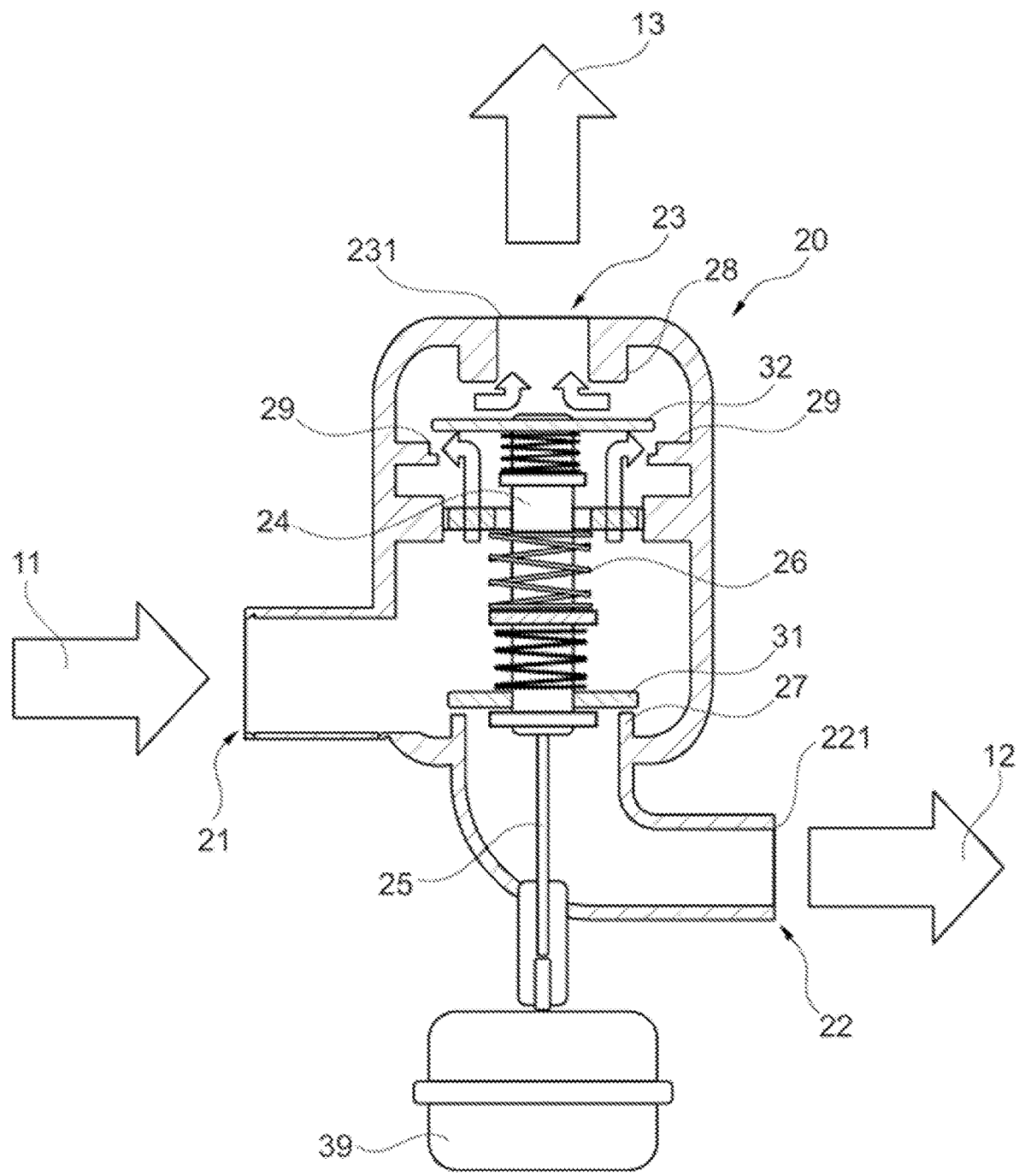
FIG. 3 shows a sectional illustration of an embodiment of the thermostat valve according to the disclosure in a second working state.

In a second working state of the thermostat valve 20, as shown in FIG. 3, the temperature of the coolant is greater than the first threshold temperature and less than a second threshold temperature. In one example, the second threshold temperature corresponds to a lower desired engine operating temperature. In one example, the second threshold temperature is equal to 87° C. At the same time, there is a low charge pressure in the intake tract 4, and therefore the actuator 39 is not activated. The expansion element 24 expands in such a way that, owing to the corresponding movement of the transmission pin 25, the second valve disk 32 is moved away from the inner valve seat 29, thereby bringing about opening of the third connection 23, whereas the second connection 22 is still closed by the first valve disk 31. Consequently, the coolant coming from the internal combustion engine 2 flows only into the third coolant line 13, that is to say through the bypass line and away from the heat exchanger 3. The second working state may be present, for example, shortly after the starting of the internal combustion engine 2, where the temperature of the internal combustion engine 2 is approaching a first operating temperature.

Figure 4:
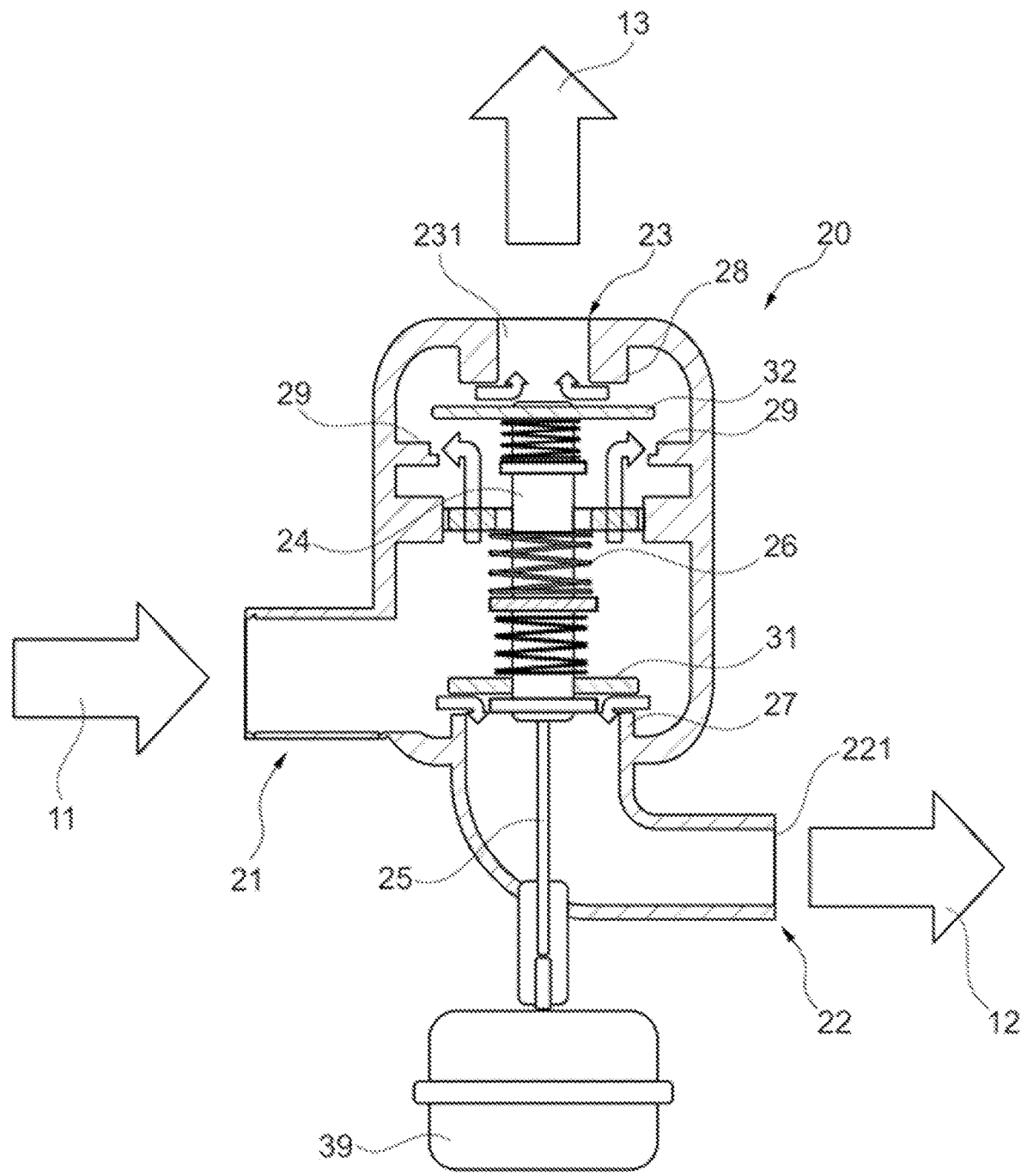
FIG. 4 shows a sectional illustration of an embodiment of the thermostat valve according to the disclosure in a third working state.

In a third working state of the thermostat valve 20, as shown in FIG. 4, the temperature of the coolant is between the second threshold temperature and a third threshold temperature. In one example, a desired engine operating range may be defined by the second and third threshold temperatures. In one example, the desired engine operating range spans from 87° C. to 95° C. There is a low charge pressure in the intake tract 4, and therefore the actuator 39 is not activated. The expansion element 24 expands in such a way that, owing to the corresponding movement of the transmission pin 25, the second valve disk 32 moves further away from the inner valve seat 29 and approaches the outer valve seat 28, as a result of which the third connection 23 remains open. In the opening region of the second connection 221, release of the first valve disk 31 from the first valve seat 27 is brought about by the movement of the transmission pin 25. In this working state, the coolant coming from the internal combustion engine 2 thus flows both through the second coolant line 12 to the heat exchanger 3 and through the third coolant line 13, i.e. through the bypass line of the heat exchanger 3. This working state is present, for example, when the internal combustion engine 2 has reached the first operating temperature. In this case, the operating conditions correspond to a low load and a low speed of revolution of the internal combustion engine 2. In this way, coolant may flow to the bypass and to the heat exchanger 3. In one example, due to the temperature of the coolant, the third connection 23 is more open than the second connection 22. As such, the flow of coolant to the bypass 13 may be greater than the flow of coolant to the heat exchanger 3.

Figure 5:
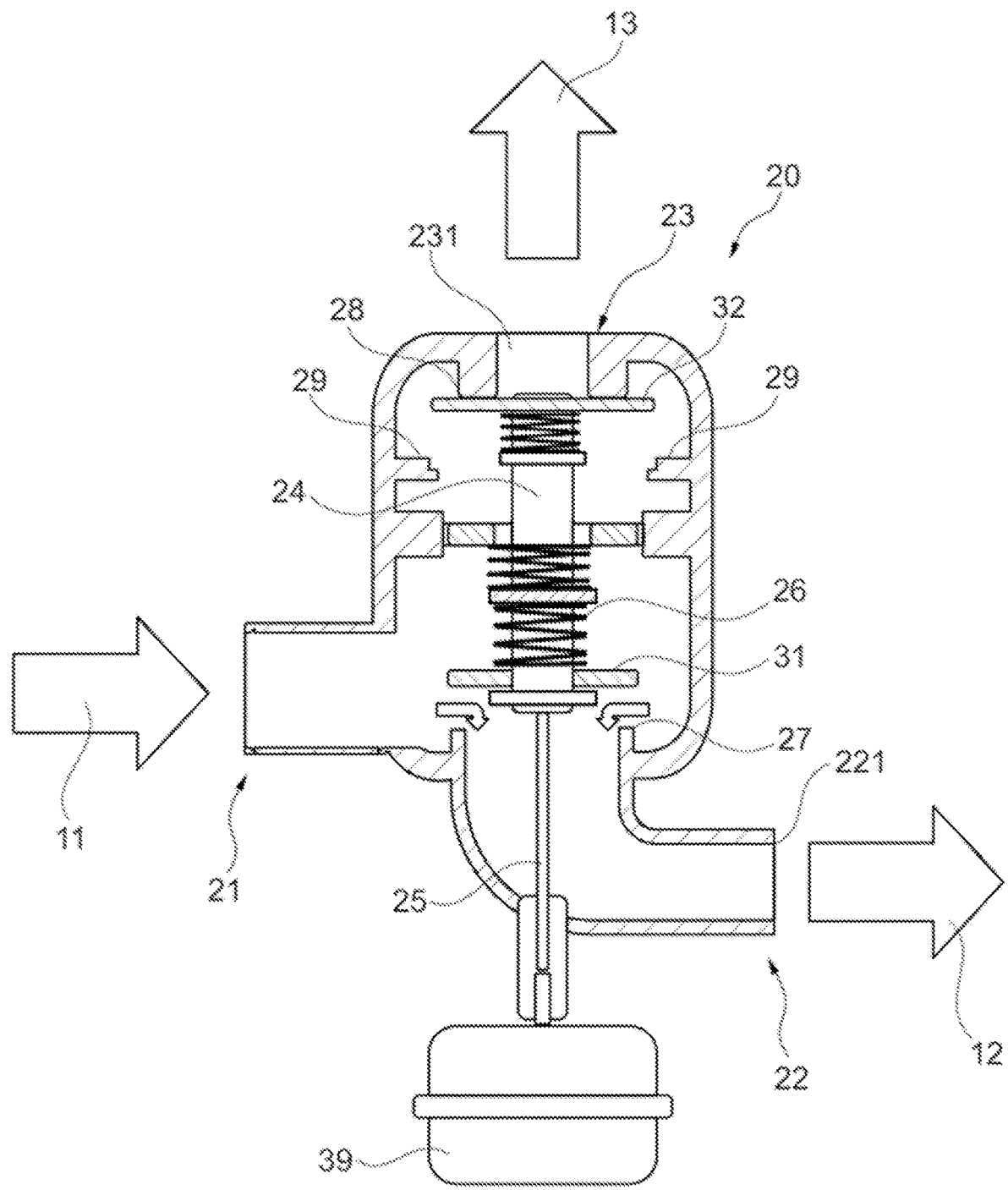
FIG. 5 shows a sectional illustration of an embodiment of the thermostat valve according to the disclosure in a fourth working state.

In a fourth working state of the thermostat valve 20, as shown in FIG. 5, the temperature of the coolant is above the third threshold temperature. In one example, the temperature of the coolant is greater than 95° C. There is a low charge pressure in the intake tract 4, and therefore the actuator 39 is not activated. At this temperature, the expansion element 24 is expanded to the maximum extent. In this case, the second valve disk 32 is in full contact with the outer valve seat 28 by virtue of the corresponding movement of the transmission pin 25. The first valve disk 31 is further away from the first valve seat 27 than in the working state as per FIG. 4. In this working state, the coolant coming from the internal combustion engine 2 thus flows through the second coolant line 12 to the heat exchanger 3 but not through the third coolant line 13. In this way, the bypass line is blocked and all coolant from the thermostat valve 20 flows to the heat exchanger 3 in the fourth working state. The fourth working state is present, for example, when the temperature of the internal combustion engine 2 is above the desired operating range. In this case, the operating conditions correspond to a low load and a low speed of revolution of the internal combustion engine 2.

Figure 6:
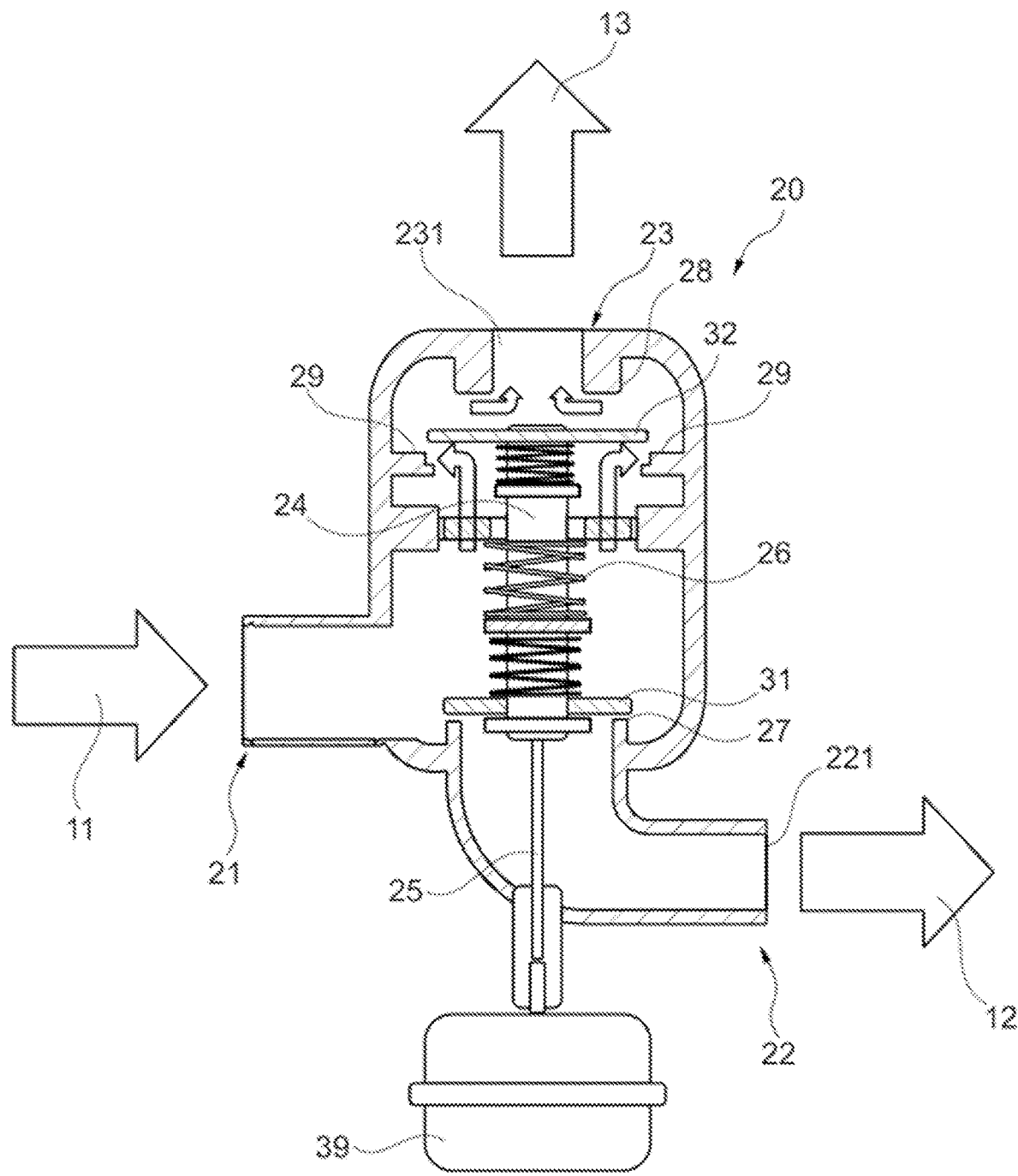
FIG. 6 shows a sectional illustration of an embodiment of the thermostat valve according to the disclosure in a fifth working state.

In a fifth working state of the thermostat valve 20, as shown in FIG. 6, the temperature of the coolant is below the first threshold temperature. In this case, the expansion element 24 has its smallest extent. A high charge pressure prevails in the intake tract 4, with the result that the actuator 39 is activated. The movement of the transmission pin 25 which is brought about thereby brings about opening of the connections, as explained with reference to FIG. 3, and therefore all coolant flows to the bypass via the third coolant line 13. In the fifth working state, the coolant does not flow to the heat exchanger 3 via the second connection 22. The fifth working state as shown in FIG. 6 may be present, for example, shortly after the starting of the internal combustion engine 2, i.e. when the internal combustion engine 2 is warming up. In one example, a high load may be present, and therefore a flow of coolant is provided for the rapid warming up of the internal combustion engine 2 that is to be expected. That is to say, the fifth working state may differ from the first working state in that a load during the fifth working state is relatively high and a load during the first working state is relatively low. Pressures from the compressor may act on the actuator 39 and cause the third connection 23 to open.

Figure 7:
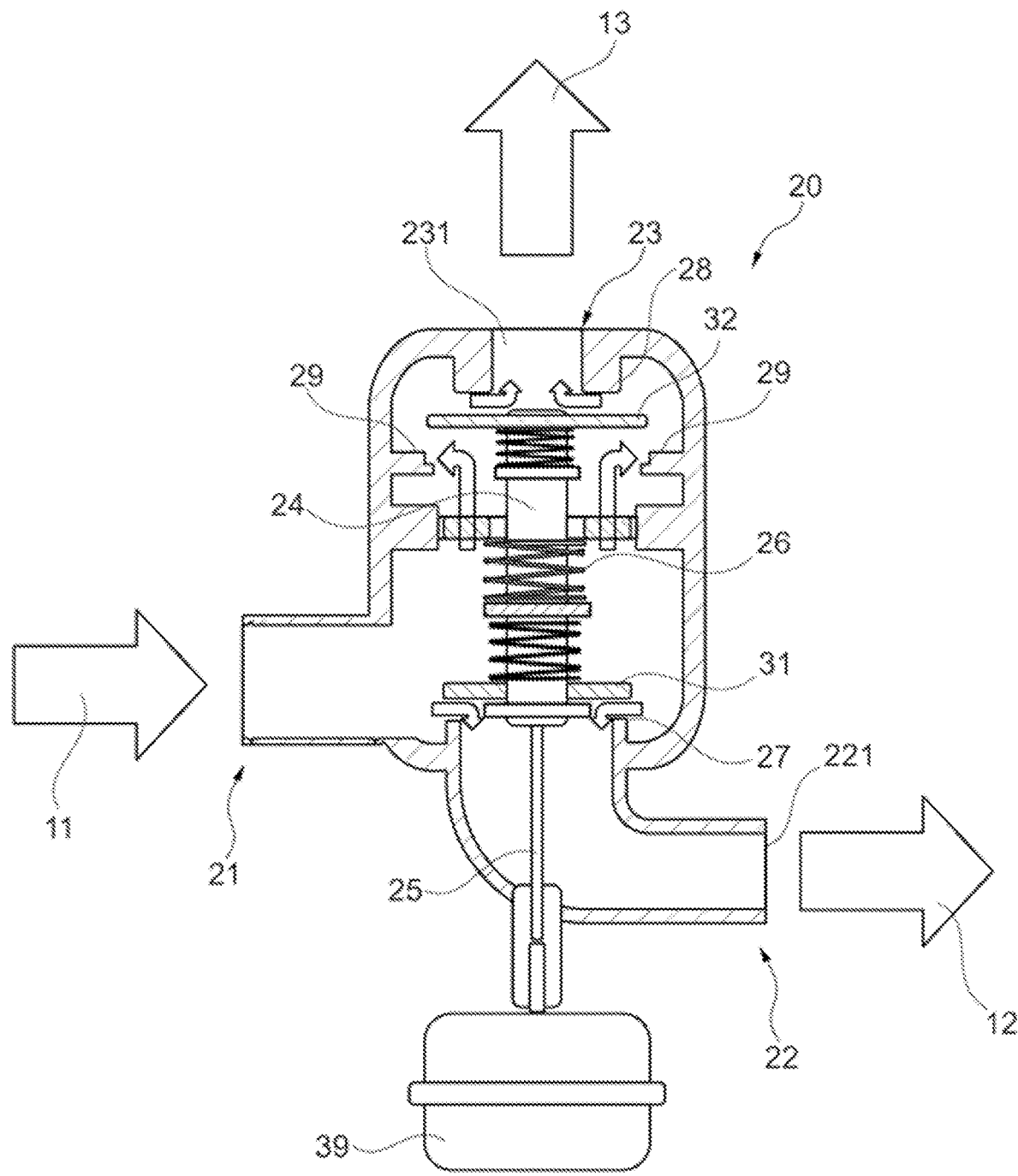
FIG. 7 shows a sectional illustration of an embodiment of the thermostat valve according to the disclosure in a sixth working state.

In a sixth working state of the thermostat valve 20, as shown in FIG. 7, the temperature of the coolant is greater than the first threshold temperature and less than or equal to the second threshold temperature. In one example, the temperature of the coolant is between 80 and 90° C. during the sixth working state. At the same time, there is a high charge pressure in the intake tract 4, and therefore the actuator 39 is activated. The expansion of the expansion element 24 and the corresponding effect on the movement of the transmission pin 25 correspond to those described with reference to FIG. 3. Owing to the action of the actuator 39, however, a further movement of the transmission pin 25 is brought about, and therefore the second valve disk 32 moves further away from the inner valve seat 29 and approaches the outer valve seat 28, with the result that the third connection 23 remains open and the first valve disk 31 likewise moves away from the first valve seat 27. In the sixth working state, the coolant coming from the internal combustion engine 2 thus flows both through the second coolant line 12 to the heat exchanger 3 and into the third coolant line 13, i.e. through the bypass line of the heat exchanger 3. This working state is present, for example, when the internal combustion engine 2 has reached the desired operating temperature range. Here, the operating conditions correspond to a high load and a high speed of revolution of the internal combustion engine. Thus, the sixth working state may include a similar coolant temperature as to that of the second working state, however, due to the high pressures in the intake, the transmission pin 25 is moved by the actuator 39 and the second connection 22 is opened. Thus, coolant flows through the heat exchanger 3 via the second connection 22 and through the bypass via the third connection 23 in the sixth working state, whereas coolant only flows through the bypass in the second working state.

Figure 8:
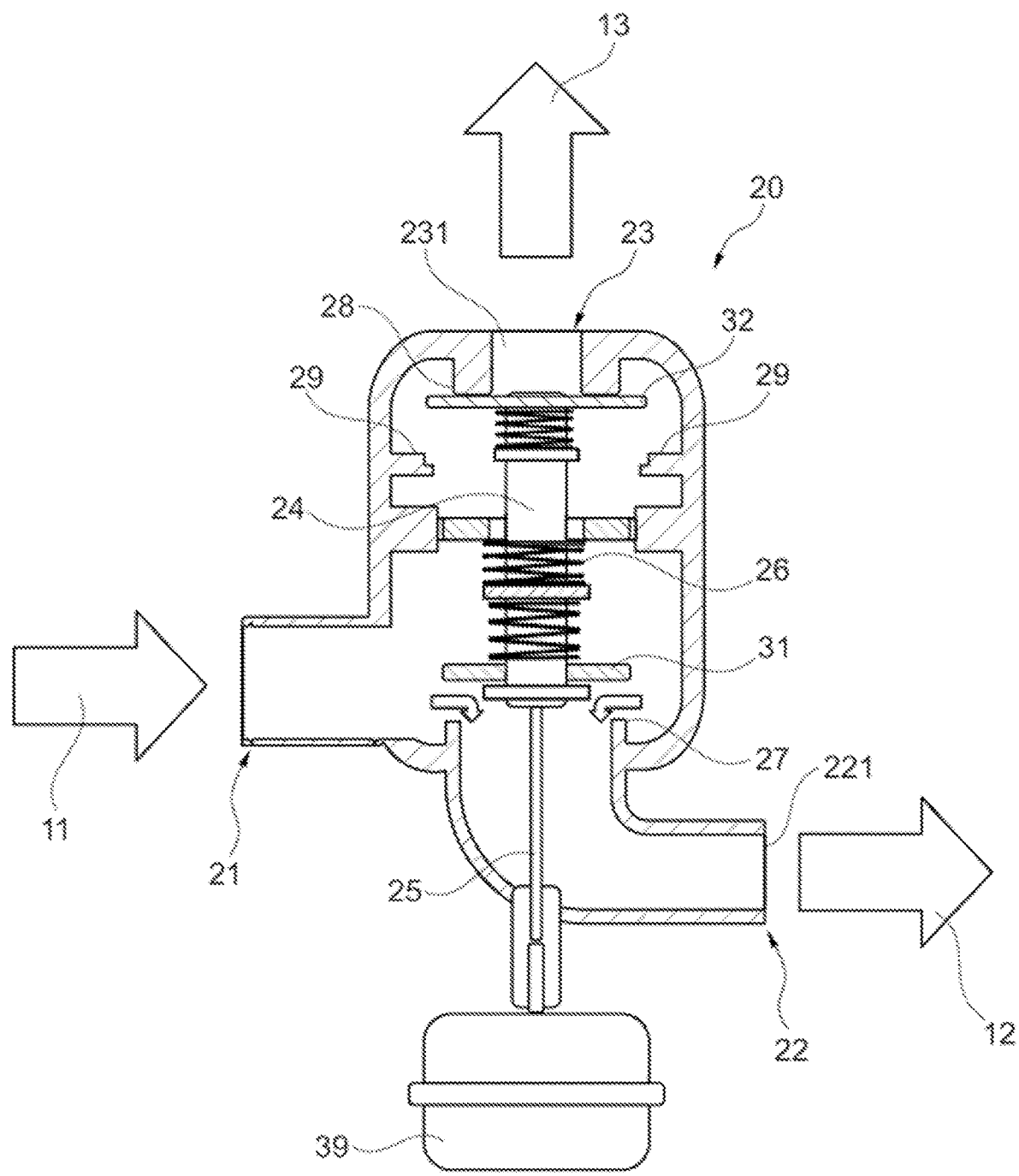
FIG. 8 shows a sectional illustration of an embodiment of the thermostat valve according to the disclosure in a seventh working state.

In a seventh working state of the thermostat valve 20, as shown in FIG. 8, the temperature of the coolant is between the second threshold temperature and the third threshold temperature. In one example, the temperature of the coolant is 90° C. There is a high charge pressure in the intake tract 4, and therefore the actuator 39 is activated. The expansion of the expansion element 24 and the corresponding effect on the movement of the transmission pin 25 correspond to those described with reference to FIG. 4. Owing to the action of the actuator, however, a further movement of the transmission pin 25 is brought about, and therefore the third connection 23 is closed by the second valve disk 32 at the outer valve seat 28, and the second connection 22 is opened by about 50% by the first valve disk 31. In the seventh working state, the coolant coming from the internal combustion engine 2 thus flows through the second coolant line 12 to the heat exchanger 3 but not through the third coolant line 13 to the bypass. The seventh working state is present, for example, when the temperature of the internal combustion engine 2 is above the second threshold temperature and less than the third threshold temperature. Here, the operating conditions correspond to a high load and a high speed of revolution of the internal combustion engine. The seventh working state may differ from the third working state in that the third connection 23 is completely sealed despite the coolant temperatures of the seventh and third working states being similar.

Figure 9:
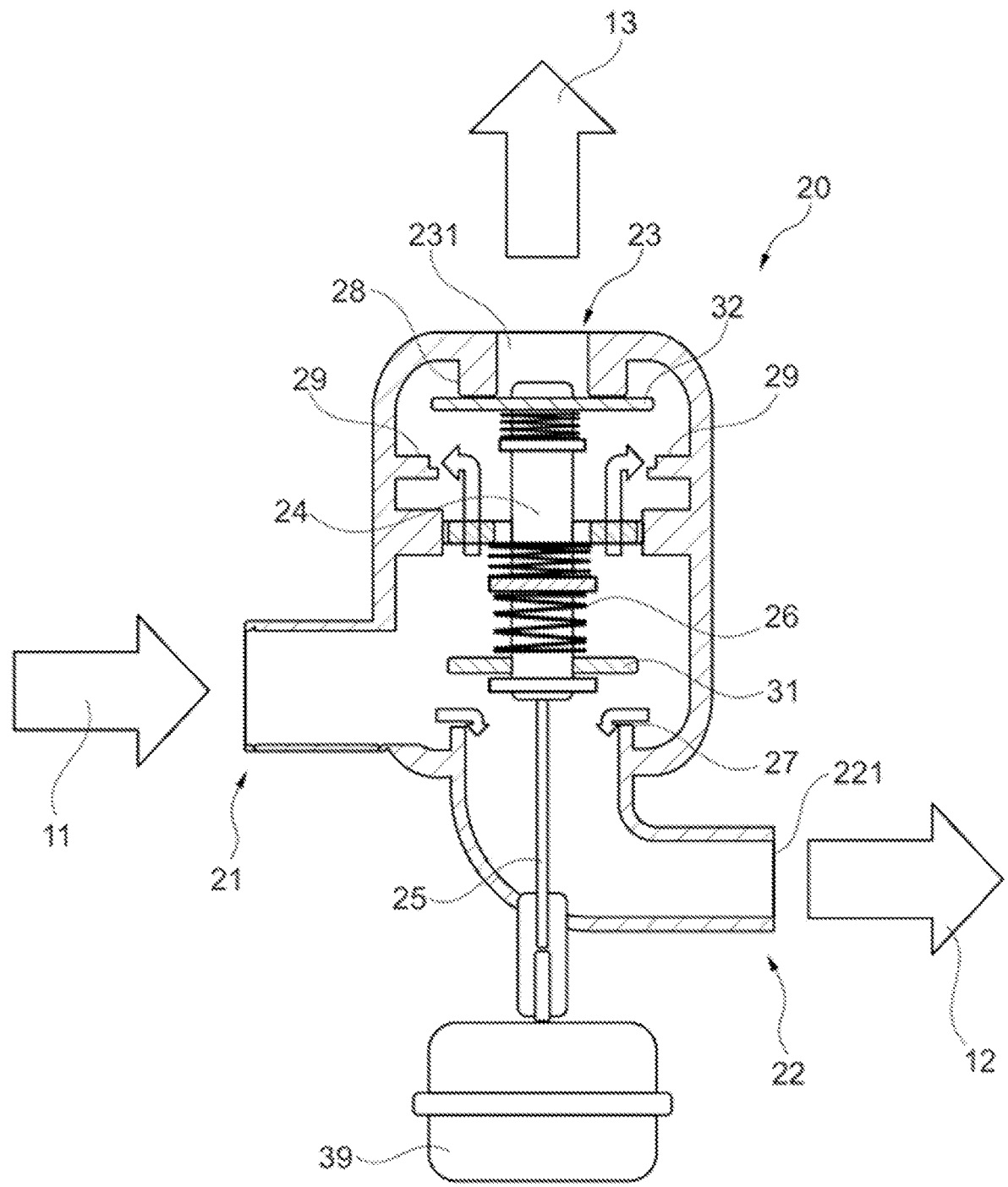
FIG. 9 shows a sectional illustration of an embodiment of the thermostat valve according to the disclosure in an eighth working state.

In an eighth working state of the thermostat valve 20, as shown in FIG. 9, the temperature of the coolant is above the third threshold temperature. In one example, the temperature of the coolant is 95° C. There is a high charge pressure in the intake tract 4, and therefore the actuator 39 is activated. At this temperature, the expansion element 24 is expanded to the maximum extent. In this case, the second valve disk 32 is in full contact with the outer valve seat 28 by virtue of the corresponding movement of the transmission pin 25. By the action of the actuator 39, the first valve disk 31 is pushed even further away from the first valve seat 27 than, for example, in the seventh working state as shown in FIG. 8, and therefore the second connection 22 is 100% open. In the eighth working state, the coolant coming from the internal combustion engine 2 thus flows through the second coolant line 12 to the heat exchanger 3 but not through the third coolant line 13 to the bypass. A flow rate of coolant to the heat exchanger 3 may be higher in the eighth working state than in the seventh working state. The eighth working state is present, for example, when the temperature of the internal combustion engine 2 is above the third threshold temperature. Here, the operating conditions correspond to a high load and a high speed of revolution of the internal combustion engine 3. The eighth working state may differ from fourth working state of FIG. 4 in that the second connection 22 is more open in the eighth working state. In one example, the flow rate of coolant through the second connection 22 to the heat exchanger 3 is higher in the eighth working state than in the fourth working state. In one example, the flow rate of coolant to the heat exchanger 3 is highest in the eighth working state due to the high load and the coolant temperature being higher than the third threshold temperature.

In a further embodiment, the thermostat valve 20 may also have an additional element which delays the movement of the transmission pin 25 and thus the opening and closing of the connections 22, 23. Thus, even after reduction of the charge pressure, for a certain period of time, quick flowing of coolant to the heat exchanger 3 is still made possible if the internal combustion engine 2 still has elevated temperatures. The delaying element may be configured as a throttle point in the feed line 40 to the actuator 39 or else directly at the actuator 39, which throttle point delays the transmission of the charge pressure into and out of the actuator 39. Through corresponding design of the throttle, it is thus possible for a targeted temporal delay to be achieved. A throttle with a type of "valve function" that differently delays the flow of the charge air into or out of the actuator is also possible. In this way, a short reaction time could be achieved in the case of a jump from low load to high load. Via inclusion of the delaying element, each of the first through eighth working states may be modified and/or delayed relatively to the previously described positions.

It will be appreciated that the first through eighth working states may be adjusted based on coolant temperatures and charge pressures. For example, openings of the second connection 22 and the third connection 23 may be varyingly adjusted from fully closed to fully open positions based on coolant temperatures and charge pressures.

In this way, FIGS. 1-9 illustrate a system including an engine, a compressor arranged in an intake passage coupled to the engine, a cooling system coupled to a cooling jacket of the engine, and a valve comprising a first connection fluidly coupled to an outlet of the cooling jacket, the valve further comprising a second connection fluidly coupled to a heat exchanger, and wherein the valve further comprises a third connection fluidly coupled to a bypass configured to direct coolant away from the heat exchanger back to the cooling jacket, wherein an expansion element and a pressure actuator are configured to move a transmission pin of the valve to one or more of a first working state, a second working state, a third working state, a fourth working state, a fifth working state, a sixth working state, a seventh working state, and an eighth working state, wherein the pressure actuator is fluidly coupled to a portion of the intake passage between the compressor and the engine via a connecting line, and wherein the transmission pin moves away from the second connection, toward the third connection, as it progresses sequentially through the first through eighth working states.

The first working state may include where a coolant temperature is less than a first threshold and a charge pressure is less than a threshold pressure, wherein the second and third connections are sealed. The second working state comprises where a coolant temperature is greater than the first threshold temperature and less than a second threshold temperature and the charge pressure is less than the threshold pressure, wherein the second connection is sealed and the third connection is at least partially opened to provide a first coolant bypass flow rate to the bypass. The third working state may include where the coolant temperature is between the second threshold temperature and a third threshold temperature and the charge pressure is less than the threshold pressure, wherein the second connection is partially opened to provide a first coolant heat exchanger flow rate and the third connection is at least partially opened to provide a second coolant bypass flow rate greater than the first coolant bypass flow rate. The fourth working state may include where the coolant temperature greater than the third threshold temperature and the charge pressure is less than a threshold pressure, wherein the second connection is fully opened and the third connection is sealed. The fifth working state may include where the coolant temperature is less than a first threshold temperature and where a charge pressure is greater than a threshold pressure, wherein the second connection is sealed and the third connection is partially opened. The sixth working state may include where the coolant temperature is between the first threshold temperature and a second threshold temperature and the charge pressure is greater than the threshold pressure, wherein the second connection is partially opened and the third connection is more opened compared the fifth working state. The seventh working state may include where the coolant temperature is between the second threshold temperature and a third threshold temperature and the charge pressure is greater than the threshold pressure, wherein the second connection is more opened compared to the sixth working state and the third connection is closed. The eighth working state may include where the coolant temperature is greater than the third threshold temperature and the charge pressure is greater than the threshold pressure, wherein the second connection is fully opened.

Figure 10:
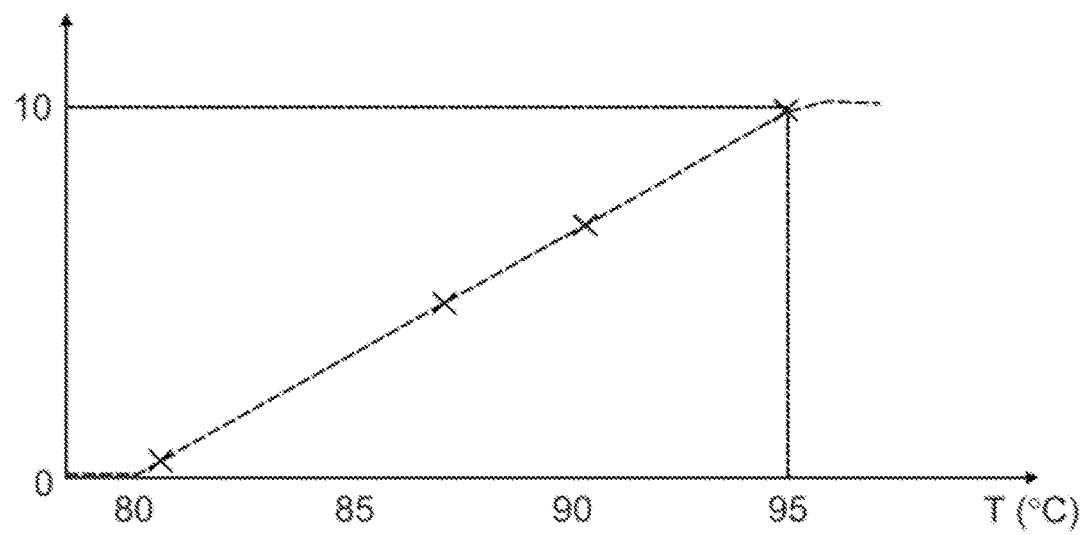
FIG. 10 shows a diagram relating to the movement characteristic of the transmission pin of the thermostat valve according to the disclosure.

FIG. 10 illustrates the dependence of the movement of the transmission pin 25 on the temperature of the coolant in a diagram. At temperatures above the first threshold temperature (e.g., 80° C.), the expansion element 24 begins to expand. Up to a temperature of 95° C., there is a linear dependence between the temperature and the movement of the transmission pin 25. At 95° C., the maximum movement of the transmission pin 25 has been attained (10 mm).

At a high charge pressure, a further movement of the transmission pin 25 is brought about. In this case, owing to a charge pressure, the movement of the transmission pin 25 is affected, and hence the opening times of the connections are affected. At a high charge pressure, the crosses and hence the entire graph would be shifted upwards.

The crosses indicated in the graphs in FIG. 10 characterize threshold values of the temperature and pressure which bring about a particular opening status of the thermostat valve 20. At the first cross, the temperature of the coolant is at a first threshold temperature (80° C.). The transmission pin is in its starting position (0 mm). In the case of a low charge pressure, the second connection 22 and the third connection 23 are closed and, at a high charge pressure, the third connection 23 would open. In the case of a second threshold value (87° C.), the second connection 22 opens at a low charge pressure. In the case of a third threshold value (90° C.), the third connection 23 closes at a high charge pressure, wherein the second connection 22 is already open. The second threshold temperature and the third threshold temperature correspond to a desired operating temperature range and could also be combined into one threshold value, for example, wherein a temperature has different effects on the movement of the transmission pin 25 at different charge pressures (that is to say that a high charge pressure brings about a greater movement of the transmission pin 25 at the same temperature), or the same charge pressure has different effects at different temperatures (that is to say that a higher temperature brings about a greater movement of the transmission pin 25 at the same charge pressure). In the case of a fourth threshold temperature (95° C.), the third connection 23 is closed, and the second connection 22 is 100% closed at a low charge pressure and 100% open at a high charge pressure.

Figure 11:
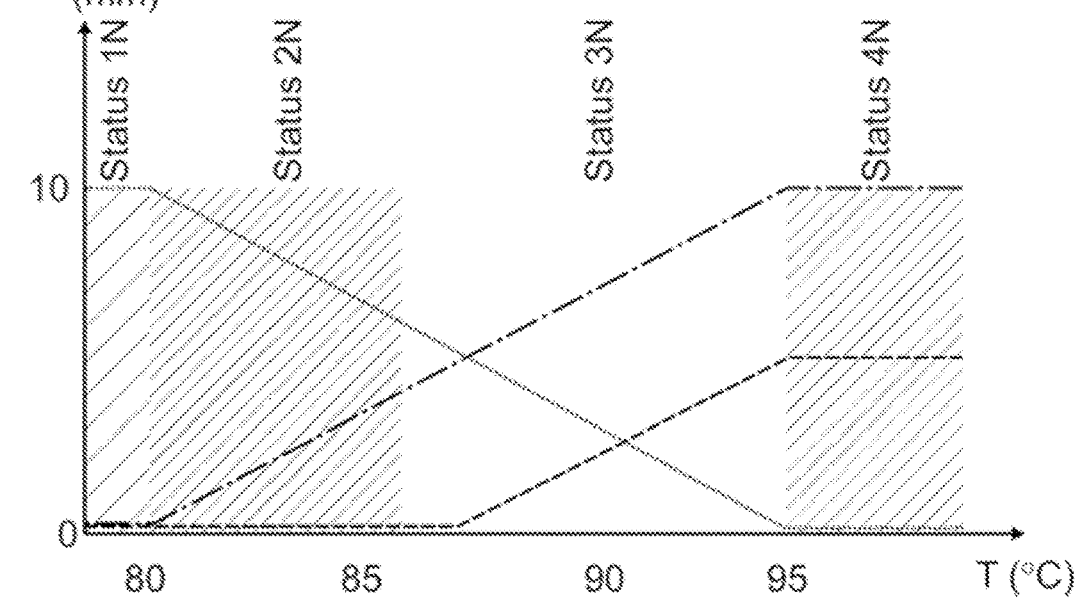
FIG. 11 shows a diagram relating to the opening characteristic of the thermostat valve according to the disclosure under conditions of low charge pressure.
Figure 12:
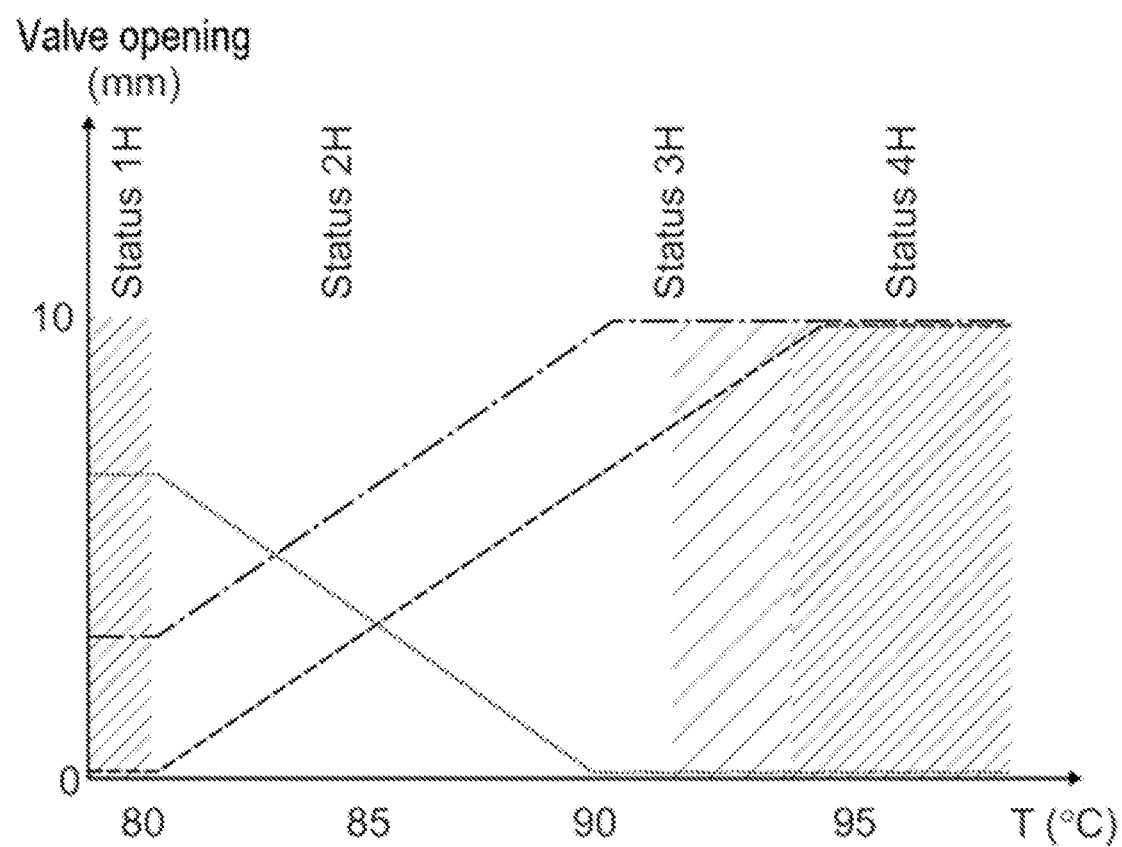
FIG. 12 shows a diagram relating to the opening characteristic of the thermostat valve according to the disclosure under conditions high charge pressure.

Diagrams are shown in FIGS. 11 and 12 to give a detailed illustration of the opening characteristic of the thermostat valve 20. The opening status of the connection 23 in the region of the holding web 27 is illustrated by a chain-dotted line, and in the region of the opening of the connection 23 by a dotted line, and the opening status in the region of the second connection 22 is illustrated by a dashed line.

FIG. 11 shows a diagram relating to the opening characteristic of the thermostat valve 20 according to the disclosure under conditions of low charge pressure. When the flow path is closed at the inner valve seat 29, coolant is not passed either through connection 23 or through connection 22 owing to the position of the transmission pin 25 in its starting position. This status is present at a temperature of below 80° C. and is here referred to as status 1N, corresponding to the first working state, in one example. At a temperature of 80° C., connection 23 begins to open at the inner valve seat 29. The closure at the outer valve seat 28 is open at a temperature of below 80° C. and begins to close by the same amount as connection 23 opens at the inner valve seat 29. At temperatures of between 80° C. and 87° C., a flow of coolant thus takes place through the bypass line (third line 13). This status, in which coolant flows through the bypass line but not to the heat exchanger 3, is referred to here as status 2N, corresponding to the second working state, in one example. At a temperature of about 87° C., the first valve disk 31 begins to be released from the first valve seat 27 and hence to open the second connection 22. Thus, coolant begins to flow through the second coolant line 12 to the heat exchanger 3. This status, in which the coolant flows both to the heat exchanger 3 and through the third coolant line 13, is referred to here as status 3N, corresponding to the third working state, in one example. At a temperature of 95° C., the second valve disk 32 has reached the outer valve seat 28 and thus closes the third connection 23, with the result that no coolant flows through the bypass line. At the same time, the second connection 22 is about 50% open, and therefore coolant is passed only to the heat exchanger 3. This status is referred to here as status 4N, corresponding to the fourth working state, in one example.

FIG. 12 shows a diagram relating to the opening characteristic of the thermostat valve 20 according to the disclosure under conditions of high charge pressure. Dashed line 1210 illustrates a bypass coolant flow in response to charge pressure. Dashed line 1220 illustrates no flow and low flow conditions, wherein low flow conditions may be used if an engine warm-up occurs more rapidly due to the low flow. Dashed line 1230 illustrates an opening characteristic of the second connection to the heat exchanger.

In this case, neither the inner valve seat 29 nor the outer valve seat 28 are in contact with the second valve disk 32 at temperatures of the coolant of up to 80° C., and therefore the third connection 23 is open. The second connection 22 is closed, and therefore coolant flows through the third coolant line 13 (bypass line) but not to the heat exchanger. This status is referred to as status 1H. At a temperature of 80° C., the expansion element 24 begins to expand and to move the transmission pin 25, with the result that the second valve disk 32 moves away from the inner valve seat 29 and approaches the outer valve seat 28. Thus, up to a temperature of 90° C., coolant flows both through the second coolant line 12 to the heat exchanger 3 and through the third coolant line 13 (bypass line). This status is referred to as status 2H. At a temperature of 90° C., the outer valve seat 28 is closed. Thus, coolant no longer flows through the bypass line and flows only to the heat exchanger 3 because the second connection 22 is about 50% open. This status is referred to as status 3H. At a temperature of 95° C., the second connection 22 is completely open (100%), while the third connection 23 is closed. As a result, maximum possible cooling is provided. This status is referred to as status 4H.

In this way, a valve included in a coolant system may include elements configured to variably control coolant flow without electrical connections. The valve may include a wax element configured to phase shift in response to a coolant temperature along with a pressure actuator fluidly coupled to a portion of an intake system between a compressor and an engine. The valve comprises a transmission pin along with biasing elements configured to actuate one or more plates. In a resting position, such as the first working state, the plates are pressed against interior surfaces and block flow of coolant through all outlets of the valve. As such, the first working state may correspond to no-flow condition. As coolant temperatures increase, the wax element may melt and actuate the plates to various flow conditions. In one example, if the wax element is completely melted, a second connection of the valve may be at least partially open and a third connection of the valve may be fully sealed. The second connection directs coolant to a heat exchanger and the third connection directs coolant to a bypass, which diverts coolant away from the heat exchanger and directly back to the engine.

The plates may be further move in response charge pressures via the pressure actuator. In one example, the pressure actuator may actuate the transmission pin in response to only charge pressures above a threshold pressure. The threshold pressure may correspond to charge pressures generated during high engine loads. Additionally or alternatively, the pressure actuator may be configured to actuate the transmission pin in response to charge pressures above a low charge pressure, wherein the low charge pressure corresponds to charge pressures generated during low engine loads. By actuating the transmission pin via the wax element and the pressure actuator, the valve may variably adjust coolant flow to the bypass and the heat exchanger.

For example, the bypass may include two extreme positions, with variably open positions therebetween. A resting position of the plate, furthest from the third connection may correspond to a first fully closed position. Similarly, a position of the plate nearest the third connection may correspond to a second fully closed position, which may be achieved when pressures are high and/or when coolant temperatures are high. Positions between the first and second fully closed positions may correspond to partially open positions of the third connection, wherein a position directly between the first and second fully closed positions corresponds to a most open position of the third connection.

The second connection may include only a single fully closed position with a disk pressed against a corresponding disk seat. Positions of the disk outside of the fully closed position may correspond to various flow conditions to the heat exchanger. The second connection may include a fully open position corresponding to a highest flow rate of coolant through the second connection to the heat exchanger. The fully open position may be desired when each of the temperature of the coolant is above a desired operating temperature range and the charge pressure is relatively high. During conditions where the temperature of the coolant is not above the desired operating temperature range and/or where the charge pressure is less than a high charge pressure, the disk may be adjusted between the fully closed and fully open positions to control coolant flow to the heat exchanger. By doing this, a desired amount of cooling may be provided to the coolant without convoluted electrical connections and routines.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A thermostat valve for controlling the flow of a fluid medium in a coolant circuit of a pressure-chargeable internal combustion engine, the thermostat valve comprising:
   an expansion element operatively connected to a transmission pin of the valve, wherein the expansion element moves the transmission pin via phase-changing in response to a temperature of the fluid medium;
   an actuator operatively connected to the transmission pin, wherein the actuator is controlled in response to a pressure outside of the valve; and
   at least one first connection, at least one second connection, and at least one third connection, wherein an opening of the second connection is controlled via a first valve disk connected to the transmission pin and moved to or away from a first valve seat, and wherein an opening of the third connection is controlled via a second valve disk connected to the transmission pin, the second valve disk moved to and away from a second valve seat; wherein
   a third valve seat, configured to contact the second valve disk, is arranged upstream of the second valve seat relative to a direction of coolant flow, and wherein the opening of the third connection is adjusted based on the second valve disk moving between the third valve seat and the second valve seat, and wherein the third connection is sealed via pressing the second valve disk against the second valve seat or the third valve seat.

2. The thermostat valve of claim 1, wherein the actuator is coupled to a variable-pressure location via a connecting line.

3. The thermostat valve of claim 1, wherein the second valve disk is in face-sharing contact with the third valve seat when the transmission pin is in a starting position.

4. The thermostat valve of claim 3, wherein the second valve disk is in face-sharing contact with the second valve seat when the transmission pin is in an end position.

5. The thermostat valve of claim 4, wherein the at least third connection is blocked in each of the starting position and end position of the transmission pin.

6. The thermostat valve of claim 1, wherein the transmission pin is actuated to a first working state, a second working state, a third working state, a fourth working state, or a fifth working state, wherein the first working state comprises where the second connection and the third connection are closed, wherein the second working state comprises where the second connection is closed and the third connection is at least partially open to a first amount, wherein the third working state comprises where the second connection is at least partially open to a first opening and the third connection is at least partially open to a second amount greater than the first amount, wherein the fourth working state comprises where the second connection is at least partially open to a second opening greater than the first opening and the third connection is closed, and wherein the fifth working state comprises where the second connection is fully open and the third connection is closed.

7. The thermostat valve of claim 6, wherein the third connection is closed in the first working state via the second valve disk being in face-sharing contact with the third valve seat, and wherein the third connection is closed in the fourth working state and the fifth working state via the second valve disk being in face-sharing contact with the second valve seat.

8. The thermostat valve of claim 1, further comprising a connecting line extending from the actuator to a portion of an intake system between a compressor and the internal combustion engine.

9. The thermostat valve of claim 1, further comprising a first coolant line extending from the internal combustion engine to the at least first connection, further comprising a second coolant line extending from the at least second connection to a heat exchanger, and further comprising a third coolant line extending from the at least third connection to a bypass, wherein the bypass is configured to return coolant to the internal combustion engine without flowing the coolant to the heat exchanger.

10. The thermostat valve of claim 1, wherein the second valve seat is an outer valve seat and the third valve seat is an inner valve seat relative to a middle of the valve, and wherein the thermostat valve is free of electric couplings.

11. A system, comprising:
   an engine;
   a compressor arranged in an intake passage coupled to the engine;
   a cooling system coupled to a cooling jacket of the engine; and
   a valve comprising a first connection fluidly coupled to an outlet of the cooling jacket, the valve further comprising a second connection fluidly coupled to a heat exchanger, and wherein the valve further comprises a third connection fluidly coupled to a bypass configured to direct coolant away from the heat exchanger back to the cooling jacket, the valve further comprising a first valve disk and a second valve disk, wherein the first connection is sealed via pressing the first valve disk against the a first valve seat, and wherein the third connection is sealed via pressing the second valve disk against a second valve seat or a third valve seat; wherein an expansion element and a pressure actuator are configured to move a transmission pin of the valve to one or more of a first working state, a second working state, a third working state, a fourth working state, a fifth working state, a sixth working state, a seventh working state, and an eighth working state, wherein the pressure actuator is fluidly coupled to a portion of the intake passage between the compressor and the engine via a connecting line, and wherein the transmission pin moves away from the second connection, toward the third connection, as it progresses sequentially through the first through eighth working states.

12. The system of claim 11, wherein the first working state comprises where a coolant temperature is less than a first threshold and a charge pressure is less than a threshold pressure, wherein the second and third connections are sealed.

13. The system of claim 11, wherein the second working state comprises where a coolant temperature is greater than the first threshold temperature and less than a second threshold temperature and the charge pressure is less than the threshold pressure, wherein the second connection is sealed and the third connection is at least partially opened to provide a first coolant bypass flow rate to the bypass.

14. The system of claim 13, wherein the third working state comprises where the coolant temperature is between the second threshold temperature and a third threshold temperature and the charge pressure is less than the threshold pressure, wherein the second connection is partially opened to provide a first coolant heat exchanger flow rate and the third connection is at least partially opened to provide a second coolant bypass flow rate greater than the first coolant bypass flow rate.

15. The system of claim 11, wherein the fourth working state comprises where the coolant temperature greater than the third threshold temperature and the charge pressure is less than a threshold pressure, wherein the second connection is fully opened and the third connection is sealed.

16. The system of claim 11, wherein the fifth working state comprises where the coolant temperature is less than a first threshold temperature and where a charge pressure is greater than a threshold pressure, wherein the second connection is sealed and the third connection is partially opened.

17. The system of claim 16, wherein the sixth working state comprises where the coolant temperature is between the first threshold temperature and a second threshold temperature and the charge pressure is greater than the threshold pressure, wherein the second connection is partially opened and the third connection is more opened compared the fifth working state.

18. The system of claim 17, wherein the seventh working state comprises where the coolant temperature is between the second threshold temperature and a third threshold temperature and the charge pressure is greater than the threshold pressure, wherein the second connection is more opened compared to the sixth working state and the third connection is closed.

19. The system of claim 18, wherein the eighth working state comprises wherein the coolant temperature is greater than the third threshold temperature and the charge pressure is greater than the threshold pressure, wherein the second connection is fully opened.

* * * * *